(12) United States Patent
Tung et al.

(10) Patent No.: US 8,683,245 B2
(45) Date of Patent: Mar. 25, 2014

(54) COMPUTER SYSTEM WITH POWER SAVING FUNCTION

(75) Inventors: Po-Jun Tung, Taipei (TW); Fu-Hsiang Liu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 404 days.

(21) Appl. No.: 13/192,480

(22) Filed: Jul. 28, 2011

(65) Prior Publication Data

US 2012/0036382 A1 Feb. 9, 2012

(30) Foreign Application Priority Data

Aug. 4, 2010 (TW) ............................... 99125996 A

(51) Int. Cl.
G06F 1/32 (2006.01)
G06F 1/26 (2006.01)

(52) U.S. Cl.
USPC .......................................................... 713/320

(58) Field of Classification Search
USPC .......................................................... 713/320
See application file for complete search history.

(56) References Cited

U.S. PATENT DOCUMENTS

| | | | |
|---|---|---|---|
| 6,622,191 B1 | 9/2003 | Nakamura | |
| 2001/0008400 A1 * | 7/2001 | Moriwaki et al. | 345/534 |
| 2005/0154760 A1 * | 7/2005 | Bhakta et al. | 707/104.1 |
| 2006/0125839 A1 * | 6/2006 | Harper | 345/582 |
| 2006/0200573 A1 * | 9/2006 | Lin | 709/231 |
| 2007/0211559 A1 | 9/2007 | Choi et al. | |
| 2008/0082752 A1 | 4/2008 | Chary et al. | |
| 2010/0058045 A1 | 3/2010 | Borras et al. | |

FOREIGN PATENT DOCUMENTS

| | | |
|---|---|---|
| CN | 1866165 | 11/2006 |
| CN | 1983118 | 6/2007 |
| CN | 101105752 | 1/2008 |

OTHER PUBLICATIONS

"An explanation of the relevance between the references as listed and the invention of the instant application", P1-P6.

* cited by examiner

Primary Examiner — Kim Huynh
Assistant Examiner — Austin Hicks
(74) Attorney, Agent, or Firm — Jianq Chyun IP Office

(57) ABSTRACT

A computer system capable of showing documents for users to read in a power saving mode is disclosed. The computer system includes a system end and a display end. The system end operates normally in a normal mode, when in a reading mode, the system end converts the data in processing to N pieces of frame data, and then the system end enters a suspend mode. The display end operates continuously in the reading mode. It includes an image buffer connecting to the system end, the image buffer temporarily storing N pieces of the frame data sent by the system end, an input device generating a control signal; a display panel; and an image transmitter connected to the image buffer, the display panel and the input device. The image transmitter displays the frame data on the display panel. When in the reading mode, the image transmitter receives the control signal generated by the input device, and retrieves the specific frame data from the image buffer and sends it to the display panel for displaying.

9 Claims, 2 Drawing Sheets

COMPUTER SYSTEM WITH POWER SAVING FUNCTION

CROSS-REFERENCE TO RELATED APPLICATION

This application claims the priority benefit of Taiwan application serial no. 99125996, filed Aug. 4, 2010. The entirety of the above-mentioned patent application is hereby incorporated by reference herein and made a part of this specification.

BACKGROUND OF THE INVENTION

1. Field of the Invention

The invention relates to a computer system and, more particularly, to a system end of the computer system is in a reading mode and the computer is working in a suspend mode to save power.

2. Description of the Related Art

FIG. 1 is a schematic diagram showing a conventional computer system. The conventional computer system 10 mainly includes a processor 122, a north bridge chip 124, a south bridge chip 126, an image buffer 142, an image transmitter 144 and a display panel 146. The north bridge chip 124 includes a memory controller 152 and a graphics controller 154. The north bridge chip 124 is connected between the processor 122 and the south bridge chip 126; the image buffer 142 is connected to the memory controller 152; the image transmitter 144 is connected to the image buffer 142, the graphics controller 154 and the display panel 146. The computer system also includes a keyboard (not shown) and a mouse (not shown) connected to the south bridge chip 126, and the operating relation between them and the computer system is omitted herein.

When the computer system 10 is powered on, the graphics controller 154 detects various parameters of the display panel 146 first, such as the maximum resolution supported by the display panel 146, and outputs a display panel parameter signal to the image transmitter 144. The graphics controller 154 is communicated with the display panel 146 according to the detecting result. When the user operates the computer system 10 with the keyboard or the mouse, the processor 122 temporarily stores the frame data to the image buffer 142 via the memory controller 152 according to the operation at an operating system of the computer system 10. The frame data represents images corresponding to the user's operation in the operating system. At the same time, the image transmitter 144 also points to the frame data that temporarily stored in the image buffer 142 simultaneously, and converts the read frame data to an image data with a constant frame rate and sends it to the display panel 146 according to the read frame data and the previously received display panel parameter signal. The frame data includes data such as RGB, horizontal synchronous (Hsyn), vertical synchronous (Vsyn), and the image transmitter 144 can converts the frame data to an image data with another specification, such as a low-voltage differential signaling (LVDS), and sends it to the display panel.

For example, if when the computer system 10 is powered on, the graphics controller 154 detects that the resolution of the display panel 146 is 800×600, and after the image transmitter 144 reads the frame data temporarily stored in the image buffer 142, the image transmitter 144 should convert the read frame data to an image data with a resolution of 800×600, and then outputs it to the display panel 146 for displaying the images corresponding to the image data.

In sum, the frame data of the image buffer 142 is updated continually via the processor 122 and the memory controller 152, and the image transmitter 144 also continually reads the frame data of the image buffer 142, converts it to the image data, and outputs the image data to the display panel 146. The user can get the change of the operations at the operating system synchronously via the display panel 146.

However, if the user only uses the operating system of the computer system 10 to read a document (such as a Word or a PDF document) and does not need to edit the document, the user may spend several or dozens of minutes on reading one page of the document without operating the operating system of the computer system 10 during the reading. However, during the several or dozens minutes in reading the same page of the document, the processor 122 of the conventional computer system 10 is still in a normal mode and monitors whether the user gives any new operating command, which wastes energy of the computer system 10.

BRIEF SUMMARY OF THE INVENTION

A computer system with a normal mode and a reading mode is provided. The computer system includes a system end and a display end. The system end operates in the normal mode. When the system end enters the reading mode, after the system end converts the data in processing into N pieces of frame data, the system end enters a suspend mode. The display end operates continuously in the reading mode. the display end includes an image buffer connecting to the system end and temporarily storing N pieces of the frame data sent by the system end; an input device generating a control signal; a display panel; and an image transmitter electrically connected to the image buffer, the display panel and the input device and displaying the frame data on the display panel. In the reading mode, the image transmitter receives the control signal of the input device, and retrieves specific frame data from the image buffer, and then sends the specific frame data to the display panel for displaying.

These and other features, aspects and advantages of the present invention will become better understood with regard to the following description, appended claims, and accompanying drawings.

DETAILED DESCRIPTION OF THE EMBODIMENTS

Figure 1:
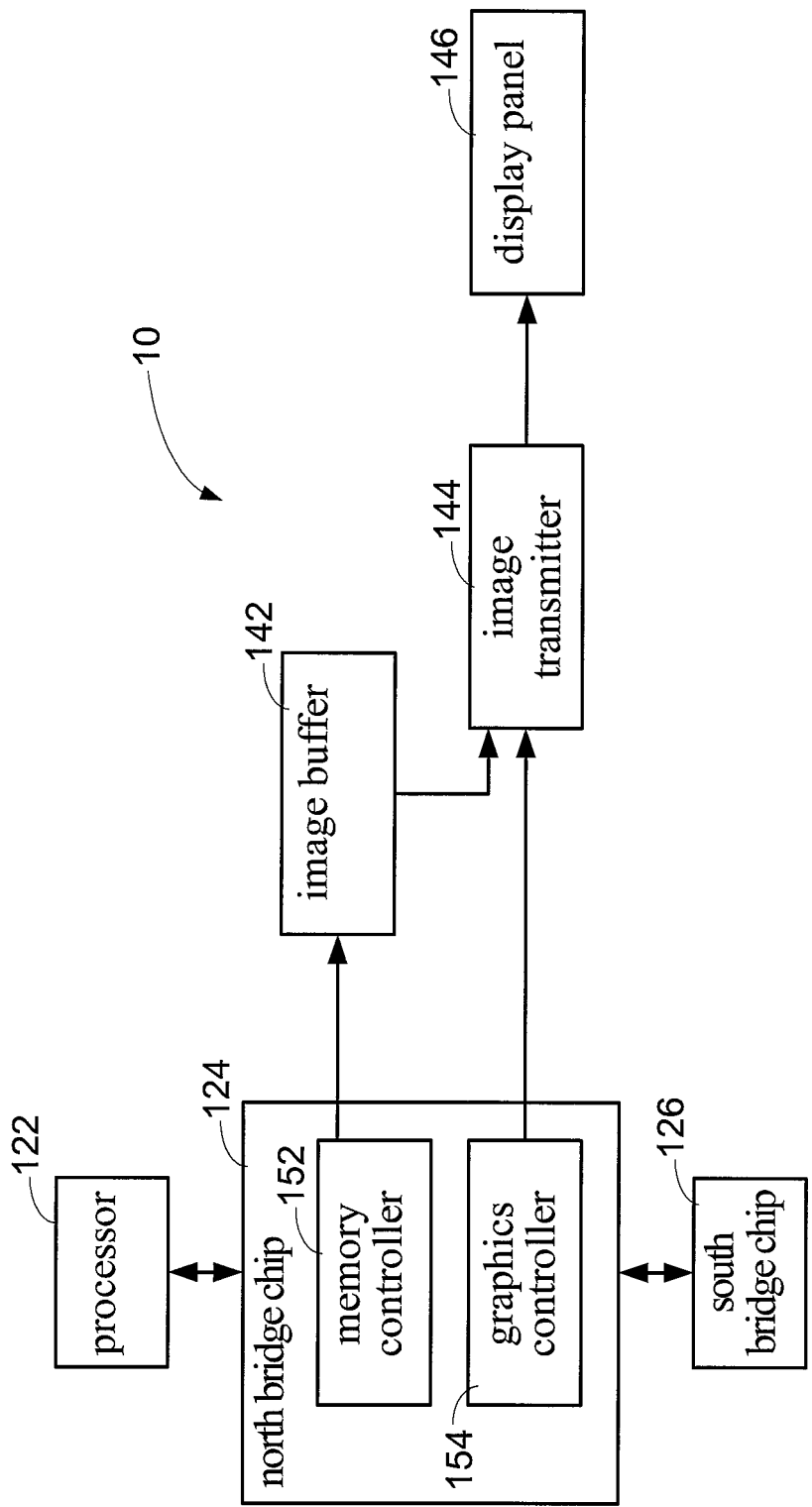
FIG. 1 is a schematic diagram showing a conventional computer system.
Figure 2:
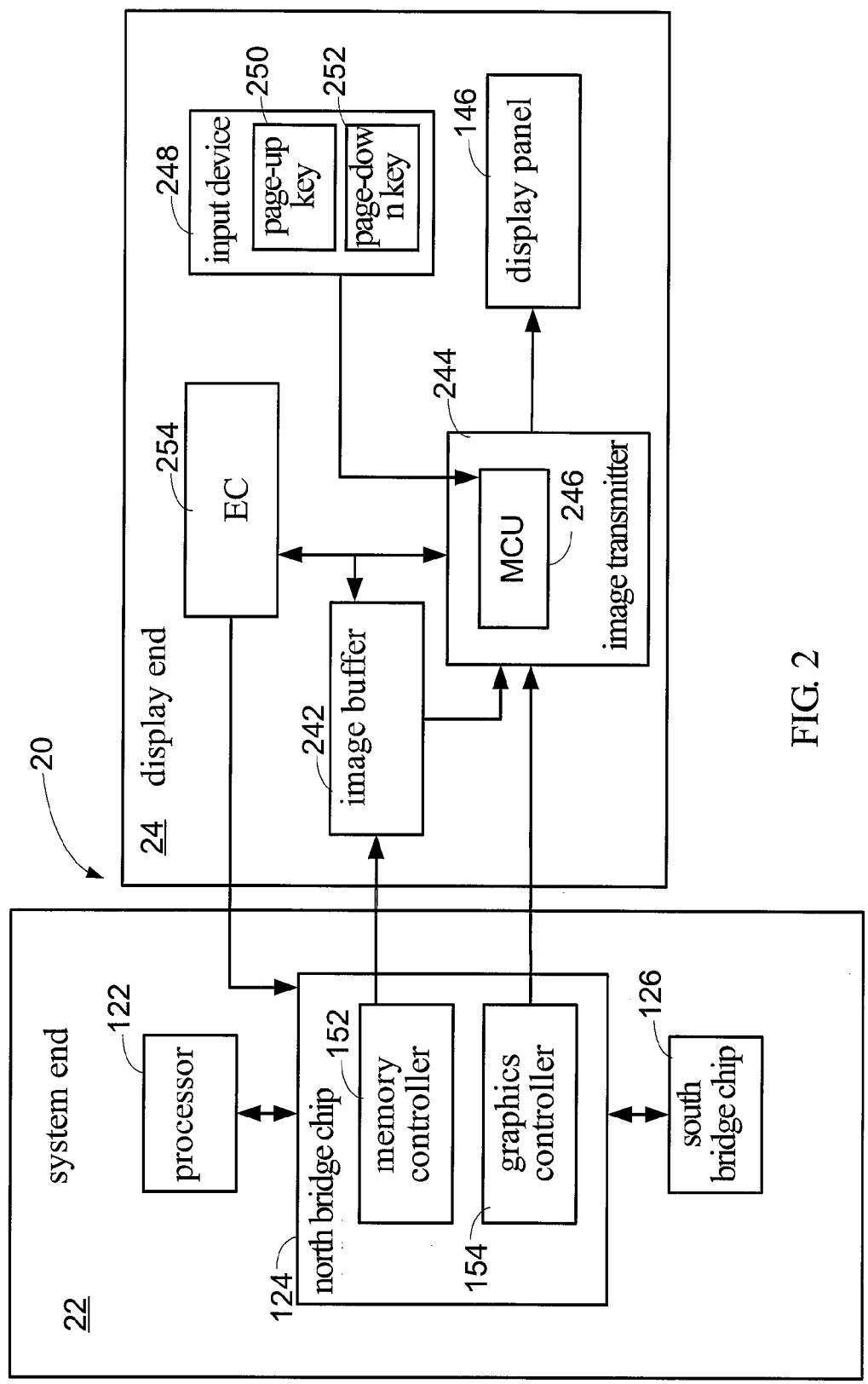
FIG. 2 is a block diagram showing a computer system with a power saving function in an embodiment of the invention.

FIG. 2 is a block diagram showing a computer system with a power saving function. The computer system 20 mainly includes a processor 122, a north bridge chip 124, a south bridge chip 126, an image buffer 242, an image transmitter 244, an embed controller (EC) 254, an input device 248 and a display panel 146. The north bridge chip includes a memory controller 152 and a graphics controller 154. The image buffer 242 of the computer system 20 can store a plurality of N pieces of the frame data at the same time. The image transmitter 244 includes a micro control unit (MCU) 246. The north bridge chip 124 is connected between the processor 122 and the south bridge chip 126, and the image buffer 242 is connected to the memory controller 152. The image transmitter 244 is connected to the image buffer 242, the graphics controller 154, the EC 254, the input device 248 and the display panel 146.

To illustrate the operation theory of the computer system 20 which saves power more conveniently, the processor 122, the north bridge chip 124, and the south bridge chip 126 may be defined as a system end 22 of the computer system 20. The image buffer 242, the EC 254, the input device 248, the image transmitter 244 and the display panel 146 may be defined as a display end 24 of the computer system 20.

The computer system 20 can operate in a normal mode and a reading mode. When the computer system 20 is in the reading mode, the system end 22 of the computer system 20 enters a suspend mode, and the display end 24 still receives a standby voltage and operates normally.

When the user opens a document (such as a Word or a PDF document) in the computer system 20 and only reads it in a certain time without any operations at operating system of the computer system 20, the user can enable an application program (AP) (not shown in FIG. 2) of the computer system 20 to make the computer system 20 enter the reading mode.

To illustrate the operation theory of the computer system 20 more conveniently, it is assumed that the document open by the user is a PDF document with 8 pages and the image buffer 242 can store data of 10 pieces of the frame page. When the user opens the 8-page PDF document and only reads it in a certain time without any operations at the operating system of the computer system 20, the user may enable the AP of the computer system 20 to make the computer system 20 enter the reading mode.

After the computer system 20 enters the reading mode, the AP controls the graphics controller 154 to capture the images from first page to eighth page of the PDF document, and temporarily stores the images from the first page to the eighth page of the PDF document in the image buffer 242 as first frame data to eighth frame data. Then, the system end 22 of the computer system 20 enters the suspend mode, and thus the system end 22 of the computer system 20 enters a power saving state. Since the first frame data to the eighth frame data of the PDF document is stored in the image buffer 242, the computer system 20 may read the first frame data to the eighth frame data in the image buffer 242 via the image transmitter 244, converts the first frame data to the eighth frame data to image datas, and sent the image datas to the display panel 146. Thus, the user can read the first page to the eighth page of the PDF document via the display panel 146.

Furthermore, the input device 248 may be further disposed in the computer system 20 to provide a control signal to allow the user to page Up/Down from the first to the eighth more conveniently. In FIG. 2, the input device 248 of the computer system 20 is connected to the MCU 246. The input device 248 includes a page-up key 250 and a page-down key 252. The page-up key 250 and the page-down key 252 may be disposed at the casing of the computer system 20. For example, when the user opens the PDF document with 8 pages and the computer system 20 enters the reading mode to stores the first frame data to the eighth frame data to the image buffer 242, in an initial state, the image transmitter 244 points to the address of the first frame data temporarily stored in the image buffer 242, and converts the first frame data to the image data to send to the display panel 146. Thus, the user can read the images at the first page of the PDF document via the display panel 146. When the user wants to read the images at the second page of the PDF document, the user presses the page-down key 252 and generates a page-down signal. The MCU 246 controls the image transmitter 244 to point to the address of the second frame data according to the page-down signal, and converts the second frame data to the image data sent to the display panel 146. Thus, the user can read the images at the second page of the PDF document via the display panel 146.

When the user wants to read the images at the first page of the PDF document again, the user presses the page-up key 250 and generates a page-up signal. The MCU 246 controls the image transmitter 244 to point to the address of the first frame data according to the page-up signal. Then, the user can read the images at the first page of the PDF document via the display panel 146. Consequently, the user may select the images to read from the first page to the eighth page of the PDF document by pressing the page-up key 250 and the page-down key 252.

The pages of the PDF document is turned by controlling the page-up key 250 and the page-down key 252 of the input device 248, but not a mouse or a keyboard in the computer system, and the MCU 246 connected with the input device 248 belongs to the display end 24 of the computer system 20. Consequently, when the user changes the pages of the PDF document displayed on the display panel 146 via the page-up key 250 and the page-down key 252, the system end 22 of the computer system 20 is not woke up. It ensures that when the user presses the page-up key 250 or the page-down key 252, the system end 22 of the computer system 20 is still in the suspend mode, which saves power of the computer system 20.

Since when the user reads the images at the first page to the eighth page of the PDF document, the system end 22 of the computer system 20 is already in the suspend mode. At the moment, the power consumption of the system end 22 of the computer system 20 is low, which saves power when the computer system 20 is in the reading mode.

As shown in FIG. 2, the EC 254 also may be disposed in the computer system 20 and connected between the north bridge chip 124 and the MCU 246. As a result, when the pages of the document are more than the pieces of the frame data stored in the image buffer 242, the computer system 20 also can saves power.

To illustrate more conveniently, it is assumed that the document opened by a user is a 45-page PDF document and the image buffer 242 can store 10 pieces of the frame data. As stated above, when the user opens the 45-page PDF document and makes the computer system 20 enter the reading mode via the AP, the AP controls the graphics controller 154 to capture the images from first page to tenth page of the 45-page PDF document, and temporarily stores the images from the first page to the tenth page of the PDF document in the image buffer 242 as the first frame data to the tenth frame data. Then, the system end 22 of the computer system 20 enters the suspend mode. When the user may finish reading the first ten pages of the PDF document soon, the north bridge chip 124 of the computer system 20 would temporarily store the frame data of some following pages to the image buffer 242. For example, the image buffer 242 already temporarily stores the first frame data to the tenth frame data of the 45-page PDF document, and the user already reads the tenth page of the 45-page PDF document. That is, when the MCU 246 detects that the image transmitter 244 points to the address of the tenth frame data of the image buffer 242, the MCU 246 controls the EC 254 to wake up the system end 22 of the computer system 20. When the system end 22 of the computer system 20 is woke up, the space occupied by the first frame data to the ninth the frame data in the image buffer 242 is cleared except the images at the tenth page (or the tenth frame data) of the 45-page PDF document which the user is reading. Thus, the AP controls the graphics controller 154 to capture the images at the eleventh page to the nineteenth page of the PDF document and temporarily stores them to the image buffer 242 as the eleventh frame data to the nineteenth frame data, respectively. After the eleventh frame data to the nineteenth frame data are temporarily stored to the image buffer 242, as stated above, the system end 22 of the computer system 20 enters the suspend mode again. That is, when the system end 22 of the computer system 20 enters the suspend mode, the power consumption of the system end 22 of the computer system 20 is relatively low, and the user may continue reading the images at the tenth page to the nineteenth page of the PDF document, which saves power when the computer system 20 is in the reading mode.

The MCU 246 records the last page of the PDF document that the user reads when the computer system 20 is in the reading mode before the system end 22 is woke up. That is, before the system end 22 of the computer system 20 is waked up, the image transmitter 244 points to the last address of the image buffer 242. For example, when the user reads the tenth page of the 45-page PDF document, the system end 22 is woke up and the tenth frame data to the nineteenth frame data of the 45-page PDF document are temporarily stored to the image buffer 242, the image transmitter 244 displays the images at the tenth page of the 45-page PDF document on the display panel 146 according to the address of the image buffer 242 pointed by the image transmitter 244 which is recorded by the MCU 246. Thus, when the user reads the 45-page PDF document on the display panel 146, the user would not feel discontinuity since new frame data is temporarily stored to the image buffer 242. Consequently, the user still can continue reading the images at the tenth page to the nineteenth page of the 45-page PDF document via the page-up key 250 and the page-down key 252.

Moreover, in the process, the system end 22 of the computer system 20 is woke up from the suspend mode by the EC 254, the eleventh frame data to the nineteenth frame data are temporarily stored to the image buffer 242, and then the computer system enters the suspend mode again, the needed time in the whole process is too short to notice. Thus, the user is not affected in reading the 45-page PDF document.

When the computer system 20 operates in the reading mode, the user may close the AP or make the computer system 20 stop operating in the reading mode by waking up the system end 22 of the computer system 20. For example, when the computer system 20 operates in the reading mode and the user finishes reading the document, or the user want to stop reading at a certain page, the user may wake up the system end 22 of the computer system 20 by pressing the mouse or the keyboard to close the AP, or make the computer system 20 stop operating in the reading mode.

In sum, since the image buffer 242 stores N pieces of the frame data, when the computer system 20 operates in the reading mode and after N pieces of the frame data is temporarily stored to the image buffer 242 via the north bridge chip 124, the system end 22 of the computer system 20 enters the suspend mode. That is, when the user reads the images at N pages of the document represented by N pieces of the frame data, since the system end 22 of the computer system 20 already enters the suspend mode, its power consumption is relatively low, which saves power when the computer system 20 is in the reading mode.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A computer system with a normal mode and a reading mode, comprising:
    a system end operating in the normal mode, wherein when the system end enters the reading mode, the system end converts the data in processing to N pieces of frame data, and the system end enters a suspend mode; and
    a display end operating continuously in the reading mode, including:
        an image buffer connecting to the system end and temporarily storing N pieces of the frame data sent by the system end;
        an input device for generating a control signal;
        a display panel; and
        an image transmitter electrically connected to the image buffer, the display panel and the input device and displaying the frame data on the display panel;
    wherein in the reading mode, the image transmitter receives the control signal of the input device, retrieves specific frame data from the image buffer, and sends the specific frame data to the display panel for displaying.

2. The computer system according to claim 1, wherein the display end further includes an embedded controller (EC) electrically connected to the image transmitter, and when the image transmitter displays last frame data of N pieces of the frame data on the display panel, the EC controls the system end to enter the normal mode from the suspend mode.

3. The computer system according to claim 2, wherein in the normal mode, the system end converts N−1 pages of the data in processing after N pages to N−1 pieces of frame data, and the system end enters the suspend mode after the system end outputs the N−1 pieces of the frame data.

4. The computer system according to claim 1, wherein the system end comprises:
    a processor;
    a north bridge chip connected to the processor, wherein the north bridge chip includes a memory controller and a graphics controller, and in the reading mode, the graphics controller converts the N pages of the data in processing to N pieces of the frame data, and the N pieces of the frame data are outputted by the memory controller; and
    a south bridge chip electrically connected to the north bridge chip.

5. The computer system according to claim 1, wherein the computer system further comprises a keyboard or a mouse electrically connected to a south bridge chip, and when the mouse or the keyboard is pressed, the system end enters the normal mode.

6. The computer system according to claim 1, wherein the computer system further includes an application program (AP), and if the AP is executed when the system end opens the data in processing, the computer system enters the reading mode.

7. The computer system according to claim 1, wherein the image transmitter includes a micro control unit (MCU) receiving a page-up signal or a page-down signal generated by the input device, and controlling the image transmitter to display previous frame data or next frame data of the specific frame data on the display panel.

8. The computer system according to claim 1, wherein the input device comprises a page-up key generating a page-up signal when the page-up key is pressed and a page-down key generating a page-down signal when the page-down key is pressed.

9. The computer system according to claim 1, wherein the input device is disposed at a casing of the computer system.

\* \* \* \* \*